(12) United States Patent
Kemmerer (10) Patent No.: US 11,530,644 B1
(45) Date of Patent: Dec. 20, 2022

(54) ERICSSON CYCLE TURBINE ENGINE

(71) Applicant: The United States of America, as represented by the Secretary of the Navy, Arlington, VA (US)

(72) Inventor: Geoffrey Robert Kemmerer, Port Hueneme, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/536,259

(22) Filed: Nov. 29, 2021

Related U.S. Application Data (60) Provisional application No. 63/121,580, filed on Dec. 4, 2020.

(51) Int. Cl.
  *F02C 7/10* (2006.01)
  *F02C 7/08* (2006.01)
  *F02C 3/08* (2006.01)

(52) U.S. Cl.
  CPC ............ *F02C 7/08* (2013.01); *F02C 3/08* (2013.01); *F05D 2210/13* (2013.01); *F05D 2260/10* (2013.01); *F05D 2260/213* (2013.01); *F05D 2260/22141* (2013.01)

(58) Field of Classification Search
  CPC .......... F02G 2242/00; F25B 2309/1401; F02C 3/09; F02C 3/08
  See application file for complete search history.

(56) References Cited

U.S. PATENT DOCUMENTS

| | | | | |
|---|---|---|---|---|
| 4,984,432 A | * | 1/1991 | Corey | F02G 1/043 417/69 |
| 9,618,013 B2 | | 4/2017 | Cherry et al. | |
| 11,421,589 B1 | * | 8/2022 | Rhyne | F02C 1/05 |
| 2015/0023807 A1 | * | 1/2015 | Cherry | F04D 17/167 417/54 |

* cited by examiner

*Primary Examiner* — Alain Chau
*Assistant Examiner* — Sean V Meiller
(74) *Attorney, Agent, or Firm* — Naval Facilities Engineering and Expeditionary Warfare Center; Jimmy M. Sauz (57) ABSTRACT

An Ericsson cycle turbine engine. The Ericsson cycle turbine may comprise: a centrifugal gas compressor, shaft, at least one heat exchanger, and a reaction turbine. The centrifugal gas compressor may function as a spinning wheel trompe and may be fed with a gas-liquid mixture. The centrifugal gas compressor may separate a gas from the gas-liquid mixture and compress that gas via centrifugal acceleration. The shaft may couple to the downstream end of the centrifugal gas compressor and may have an annular space to permit the compressed gas to travel therein. The heat exchanger may introduce heat to the compressed gas, such that isothermal expansion is approached. The reaction turbine may couple to the downstream end of the shaft and may rotate the shaft when releasing the compressed gas against a plurality of vanes. The liquid may be mercury, oil, or water. The gas may be helium, air, argon, or ammonia.

18 Claims, 6 Drawing Sheets

ERICSSON CYCLE TURBINE ENGINE

CROSS-REFERENCE TO RELATED APPLICATIONS

This Application claims the benefit of U.S. provisional patent application no. 63/121,580, filed on Dec. 4, 2020, titled "Ericsson Cycle Turbine Engine," by inventor Geoffrey Robert Kemmerer, the contents of which are incorporated herein by this reference and to which priority is claimed.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF USE

The present disclosure relates generally to turbine engines that operate on the Ericsson cycle.

BACKGROUND

In general, the efficiency of conventional engines such as combustion engines may be poor due to lost thermal energy as consequence of the laws of thermodynamics. Most diesel engines, for example, have a thermal efficiency less than 50%, whereas gasoline-powered engines may even be considerably more inefficient. This is due to the fact that a substantial amount of heat is lost when fuel is converted into mechanical energy. Factors that may contribute to lost thermal energy include the temperature at which heat enters the engine and the temperature of the environment into which the engine exhausts its waste heat. In this regard, there is a need for an improved engine that is more efficient than conventional engines.

SUMMARY OF ILLUSTRATIVE EMBODIMENTS

To minimize the limitations in the related art and other limitations that will become apparent upon reading and understanding the present specification, the following discloses embodiments of a new and useful Ericsson cycle turbine engine.

One embodiment may be an Ericsson cycle turbine engine, comprising: a centrifugal gas compressor being fed with a gas-liquid mixture and configured to separate a gas from the gas-liquid mixture and compress the gas; a shaft coupled to a downstream end of the centrifugal gas compressor and having an annular space traversing therein; a heat exchanger configured to heat the compressed gas; and a reaction turbine coupled to a downstream end of the shaft and configured to rotate the shaft when releasing the compressed gas against a plurality of vanes; wherein the shaft may be disposed within the heat exchanger and may be fixedly coupled to the centrifugal gas compressor and the reaction turbine, such that when the reaction turbine rotates, the shaft and the centrifugal gas compressor rotates. The centrifugal gas compressor may comprise: a rotating container configured to rotate about a central longitudinal axis and having an annular chamber configured to receive the gas-liquid mixture; a plurality of first fin cavities disposed within the rotating container and extending radially from the annular chamber to a plurality of separation chambers, such that the annular chamber may be in fluid communication with the plurality of separation chambers; a plurality of second fin cavities located within the rotating container and disposed adjacently between the plurality of separation chambers and the plurality of first fin cavities, the plurality of second fin cavities being in fluid communication with the plurality of separation chambers; and a plurality of compressed gas passages located radially inward from the plurality of separation chambers and in fluid communication between the plurality of separation chambers and the annular space of the shaft, such that the plurality of compressed gas passages may be configured to permit transfer of the compressed gas from the plurality of separation chambers into the annular space of the shaft. The Ericsson cycle turbine engine may further comprise a plurality of excess fluid passages in fluid communication with the plurality of second fin cavities, the plurality of excess fluid passages being configured to release a liquid without the compressed gas. The Ericsson cycle turbine engine may further comprise a plurality of outflow ports in fluid communication with the plurality of excess fluid passages. The liquid may be selected from the group of liquids consisting of: a mercury, an oil, and a water. The gas may be selected from the group of gases consisting of: a helium, an air, an argon, and an ammonia.

Another embodiment may be an Ericsson cycle turbine engine, comprising: a centrifugal gas compressor being fed with a gas-liquid mixture and configured to separate a gas from the gas-liquid mixture and compress the gas; a shaft coupled to a downstream end of the centrifugal gas compressor and having an annular space traversing therein, the annular space being configured to permit the compressed gas to travel across the shaft; a heat exchanger in heat exchange relationship with the shaft and configured to heat the compressed gas, such that isothermal expansion is approached; and a reaction turbine coupled to a downstream end of the shaft and configured to rotate the shaft when releasing the compressed gas against a plurality of vanes; wherein the shaft may be disposed within the heat exchanger; and wherein the centrifugal gas compressor, the shaft, and the reaction turbine may be centered about a central longitudinal axis and may be fixedly coupled to each other, such that when the reaction turbine rotates, the shaft and the centrifugal gas compressor rotates. The centrifugal gas compressor may be a spinning wheel trompe configured to compressed the gas via centrifugal acceleration, the centrifugal gas compressor comprising: a rotating container configured to rotate about the central longitudinal axis and having an annular chamber configured to receive the gas-liquid mixture; a plurality of first fin cavities disposed within the rotating container and extending radially from the annular chamber to a plurality of separation chambers, such that the annular chamber may be in fluid communication with the plurality of separation chambers; a plurality of second fin cavities located within the rotating container and disposed adjacently between the plurality of separation chambers and the plurality of first fin cavities, the plurality of second fin cavities being in fluid communication with the plurality of separation chambers; and a plurality of compressed gas passages located radially inward from the plurality of separation chambers and in fluid communication between the plurality of separation chambers and the annular space of the shaft, such that the plurality of compressed gas passages may be configured to permit transfer of the compressed gas from the plurality of separation chambers into the annular space of the shaft. The Ericsson cycle turbine engine may further comprise a plurality of excess fluid passages in fluid communication with the plurality of second fin cavities, the plurality of excess fluid passages being configured to release a liquid without the compressed gas. The Ericsson cycle turbine engine may further comprise a plurality of outflow ports in fluid communication with the plurality of excess fluid passages. The liquid may be selected from the group of liquids consisting of: a mercury, an oil, and a water. The gas may be selected from the group of gases consisting of: a helium, an air, an argon, and an ammonia.

Another embodiment may be an Ericsson cycle turbine engine, comprising: a tank having a liquid: a first heat exchanger configured to heat the liquid; a gas line configured to introduce gas into the liquid to create a gas-liquid mixture; a centrifugal gas compressor rotatably coupled to a downstream end of the tank and being fed with the gas-liquid mixture, the centrifugal gas compressor being configured to separate the gas from the gas-liquid mixture and compress the gas by near isothermal compression; a shaft coupled to a downstream end of the centrifugal gas compressor and having an annular space traversing across therein, the annular space being configured to permit the compressed gas to travel across the shaft; a second heat exchanger in heat exchange relationship with the shaft and configured to heat the compressed gas, such that isothermal expansion is approached; and a reaction turbine coupled to a downstream end of the shaft and configured to rotate the shaft when releasing the compressed gas against a plurality of vanes; wherein the shaft may be disposed within the second heat exchanger; and wherein the centrifugal gas compressor, the shaft, and the reaction turbine may be centered about a central longitudinal axis and may be fixedly coupled to each other, such that when the reaction turbine rotates, the shaft and the centrifugal gas compressor rotates. The centrifugal gas compressor may be a spinning wheel trompe configured to compressed the gas via centrifugal acceleration, the centrifugal gas compressor comprising: a rotating container configured to rotate about the central longitudinal axis and having an annular chamber configured to receive the gas-liquid mixture; a plurality of first fin cavities disposed within the rotating container and extending radially from the annular chamber to a plurality of separation chambers, such that the annular chamber may be in fluid communication with the plurality of separation chambers; a plurality of second fin cavities located within the rotating container and disposed adjacently between the plurality of separation chambers and the plurality of first fin cavities, the plurality of second fin cavities being in fluid communication with the plurality of separation chambers; and a plurality of compressed gas passages located radially inward from the plurality of separation chambers and in fluid communication between the plurality of separation chambers and the annular space of the shaft, such that the plurality of compressed gas passages may be configured to permit transfer of the compressed gas from the plurality of separation chambers into the annular space of the shaft. The Ericsson cycle turbine engine may further comprise a plurality of excess fluid passages in fluid communication with the plurality of second fin cavities, the plurality of excess fluid passages being configured to release a liquid without the compressed gas. The Ericsson cycle turbine engine may further comprise a plurality of outflow ports in fluid communication with the plurality of excess fluid passages. The liquid may be selected from the group of liquids consisting of: a mercury, an oil, and a water. The gas may be selected from the group of gases consisting of a helium, an air, an argon, and an ammonia.

It is an object to provide an Ericsson cycle turbine engine that utilizes a centrifugal gas compressor that functions similar to a trompe. Unlike a trompe, however, the centrifugal gas compressor disclosed herein utilizes the acceleration of gravity via centrifugal acceleration to build pressure. This may allow the centrifugal gas compressor to generate high pressure in a compact design.

It is an object to provide an Ericsson cycle turbine engine that utilizes a centrifugal gas compressor that compresses gas at a constant temperature (i.e., isothermal compression). Unlike most conventional gas compressors, which generally compress gas inefficiently due to the amount of inherent heating and work required, the centrifugal gas compressor utilized by the Ericsson cycle turbine engine preferably stores the inherent heating with the compressed gas during the compression process. In this manner, this would allow the work potential of the compressed gas to be roughly equivalent to the work required to compress the gas.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are illustrative embodiments. They do not illustrate all embodiments. They do not set forth all embodiments. Other embodiments may be used in addition or instead. Details, which may be apparent or unnecessary, may be omitted to save space or for more effective illustration. Some embodiments may be practiced with additional components or steps and/or without all of the components or steps, which are illustrated. When the same numeral appears in different drawings, it is intended to refer to the same or like components or steps.

It is to be understood that the foregoing general description and the following detailed description are exemplary and explanatory only and are not to be viewed as being restrictive of the embodiments, as claimed. Further advantages of these embodiments will be apparent after a review of the following detailed description of the disclosed embodiments, which are illustrated schematically in the accompanying drawings and in the appended claims.

DETAILED DESCRIPTION OF ILLUSTRATIVE EMBODIMENTS

In the following detailed description, numerous specific details are set forth in order to provide a thorough understanding of various aspects of one or more embodiments of the Ericsson cycle turbine engine. However, these embodiments may be practiced without some or all of these specific details. In other instances, well-known methods, procedures, and/or components have not been described in detail so as not to unnecessarily obscure the aspects of these embodiments.

Before the embodiments are disclosed and described, it is to be understood that these embodiments are not limited to the particular structures, process steps, or materials disclosed herein, but is extended to equivalents thereof as would be recognized by those ordinarily skilled in the relevant arts. It should also be understood that the terminology used herein is used for the purpose of describing particular embodiments only and is not intended to be limiting.

Reference throughout this specification to "one embodiment," "an embodiment," or "another embodiment" may refer to a particular feature, structure, or characteristic described in connection with the embodiments of the present disclosure. Thus, appearances of the phrases "in one embodiment" or "in an embodiment" in various places throughout this specification may not necessarily refer to the same embodiment.

Furthermore, the described features, structures, or characteristics may be combined in any suitable manner in various embodiments. In the following description, numerous specific details are provided, such as examples of materials, fasteners, sizes, lengths, widths, shapes, etc . . . , to provide a thorough understanding of the embodiments. One skilled in the relevant art will recognize, however, that the scope of the disclosed embodiments can be practiced without one or more of the specific details, or with other methods, components, materials, etc. . . . In other instances, well-known structures, materials, or operations are generally not shown or described in detail to avoid obscuring aspects of the disclosure.

Definitions

In the following description, certain terminology is used to describe certain features of the embodiments of the Ericsson cycle turbine engine in accordance with the present disclosure. For example, as used herein, unless otherwise specified, the term "substantially" refers to the complete, or nearly complete, extent or degree of an action, characteristic, property, state, structure, item, or result. As an arbitrary example, an object that is "substantially" surrounded would mean that the object is either completely surrounded or nearly completely surrounded. The exact allowable degree of deviation from absolute completeness may in some cases depend on the specific context. However, generally speaking, the nearness of completion will be so as to have the same overall result as if absolute and total completion were obtained.

The use of "substantially" is equally applicable when used in a negative connotation to refer to the complete or near complete lack of an action, characteristic, property, state, structure, item, or result. As another arbitrary example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "approximately" may refer to a range of values of ±10% of a specific value. For example, the expression "approximately 150 inches" may comprise the values of 150 inches ±10%, i.e. the values from 135 inches to 165 inches.

As used herein, the term "about" is used to provide flexibility to a numerical range endpoint by providing that a given value may be "a little above" or "a little below" the endpoint. In some cases, the term "about" is to include a range of not more than about two inches of deviation.

As used herein in this disclosure, the singular forms "a" and "the" may include plural referents, unless the context clearly dictates otherwise. Thus, for example, reference to an "opening" can include reference to one or more of such openings.

The present disclosure relates generally to engines, and more particularly, to turbine engines that operate on the Ericsson cycle. In general, the efficiency of conventional engines such as combustion engines may be poor due to lost thermal energy as consequence of the laws of thermodynamics. Most diesel engines, for example, have a thermal efficiency less than 50%, whereas gasoline-powered engines may even be considerably more inefficient. This is due to the fact that a substantial amount of heat is lost when fuel is converted into mechanical energy. Factors that may contribute to lost thermal energy include the temperature at which heat enters the engine and the temperature of the environment into which the engine exhausts its waste heat.

The Ericsson cycle turbine engine disclosed herein is preferably more efficient than conventional engines. The Ericsson cycle turbine engine may consume half the fuel of a diesel engine and approximately one-third the fuel of a gasoline or steam engine. As a result, the Ericsson cycle turbine engine is capable of increasing its thermal and operating efficiency. For example, when used with ships or unmanned undersea vehicles, the Ericsson cycle turbine engine may reduce inefficiencies and thus increase the range of operational distance.

In its basic configuration, the Ericsson cycle turbine engine may comprise: a centrifugal gas compressor, shaft, heat exchanger, and reaction turbine. The centrifugal gas compressor may be a spinning wheel trompe that receives gas entrained in a liquid or gas-liquid mixture. The centrifugal gas compressor may then separate the gas from the gas-liquid mixture and compressed that gas via centrifugal acceleration. The shaft may be coupled to a downstream end of the centrifugal gas compressor and may have an annular space to permit the compressed gas to travel therein. The heat exchanger may heat the compressed gas, such that isothermal expansion is approached. The reaction turbine may be coupled to a downstream end of the shaft and may rotate the shaft when releasing the compressed gas against a plurality of vanes. In various embodiments, the Ericsson cycle turbine engine may further comprise a tank that provides the gas-liquid mixture to the centrifugal gas compressor. The liquid may be mercury, oil, or water. The gas may be helium, ambient air, argon, or ammonia.

In the accompany drawings, like reference numbers indicate like elements. Reference character 1000 depicts embodiments of the Ericsson cycle turbine engine.

Figure 1A:
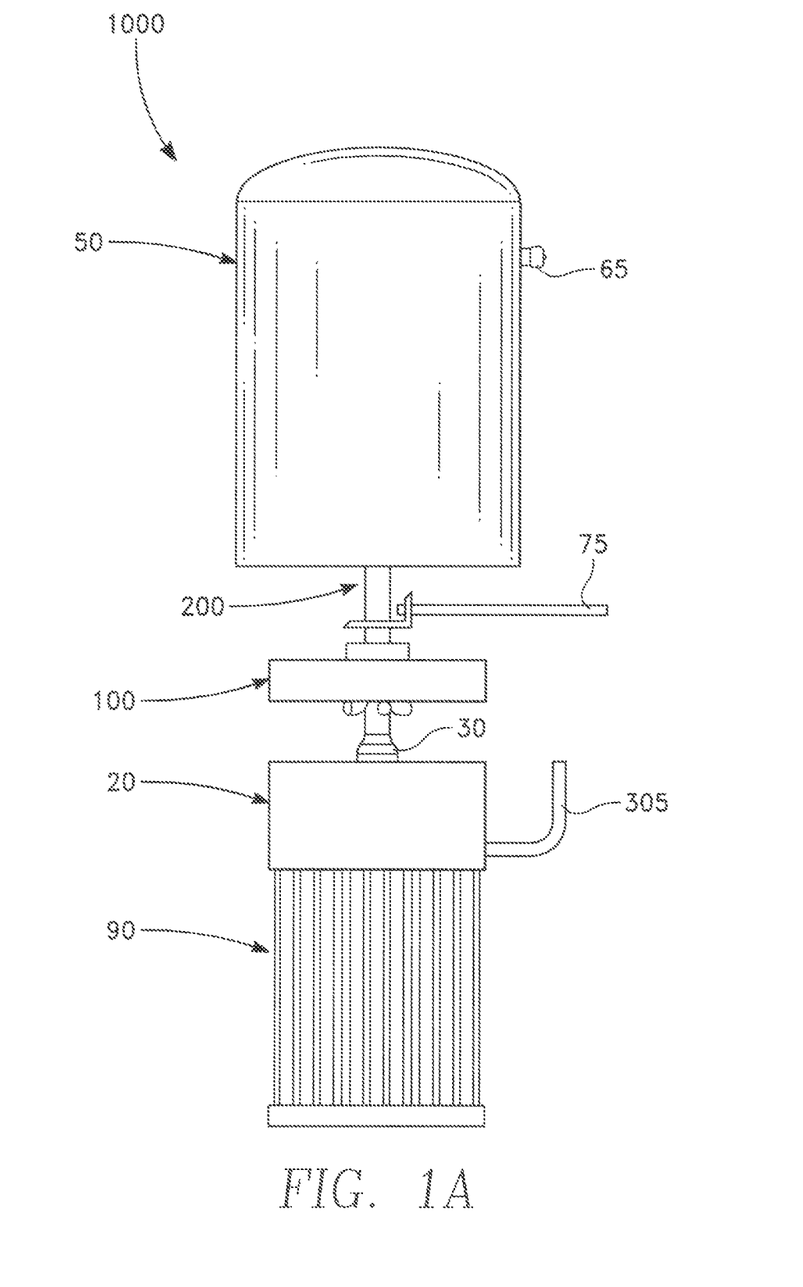
FIGS. 1A and 1B are illustrations of side elevation and cross section views, respectively, of one embodiment of an Ericsson cycle turbine engine, in accordance with the present disclosure.
Figure 1B:
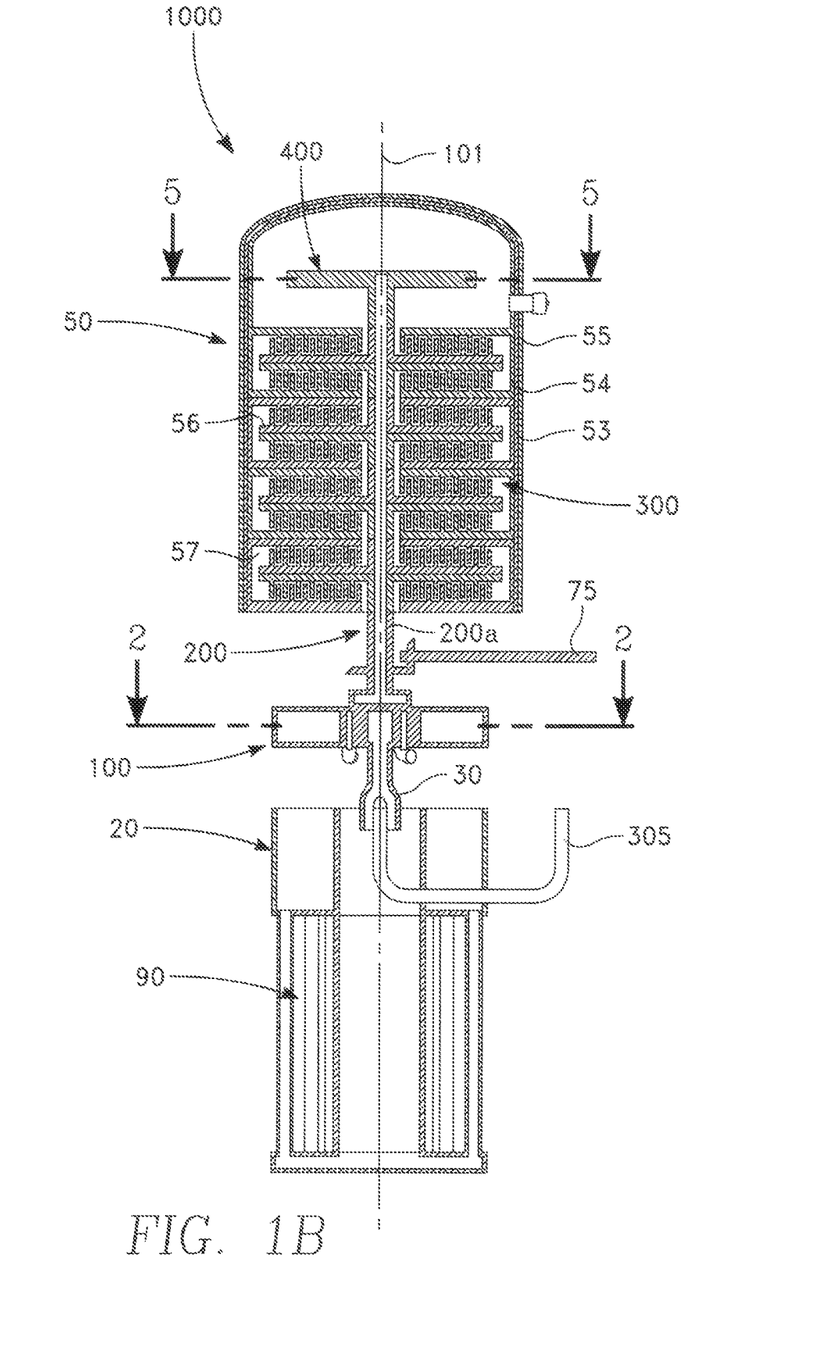

FIGS. 1A and 1B are illustrations of side elevation and cross section views, respectively, of one embodiment of an Ericsson cycle turbine engine 1000, in accordance with the present disclosure. The Ericsson cycle turbine engine 1000 disclosed herein preferably operates on the Ericsson cycle, which generally involves isothermal compression (centrifugal gas compressor), isobaric heat addition (counter flow heat exchanger), and isothermal expansion (reaction turbine). Embodiments of the Ericsson cycle turbine engine 1000 also preferably operates more efficiently than conventional engines, as the Ericsson cycle turbine engine 1000 may consume half the fuel of a diesel engine and approximately one-third the fuel of a gasoline or steam engine.

As shown in FIGS. 1A and 1B, one embodiment of the Ericsson cycle turbine engine 1000 may comprise: a tank 20 having a first heat exchanger 90, centrifugal gas compressor 100 located at a downstream end of the tank 20, shaft 200 coupled to a downstream end of the centrifugal gas compressor 100, and thermos 50 coupled to the shaft 200. Importantly, FIG. 1B shows that, within the thermos 50, the Ericsson cycle turbine engine 1000 may further comprise a reaction turbine 400 coupled to a downstream end of the shaft 200 and a second heat exchanger 300 coupled to and in heat exchange relationship with the shaft 200. Notably, FIG. 1B shows that the centrifugal gas compressor 100, shaft 200, and reaction turbine 400 may be centered about a central longitudinal axis 101 and may be fixedly coupled to each other. A power take-off shaft 75 may also be implemented in various embodiments.

Figure 6:
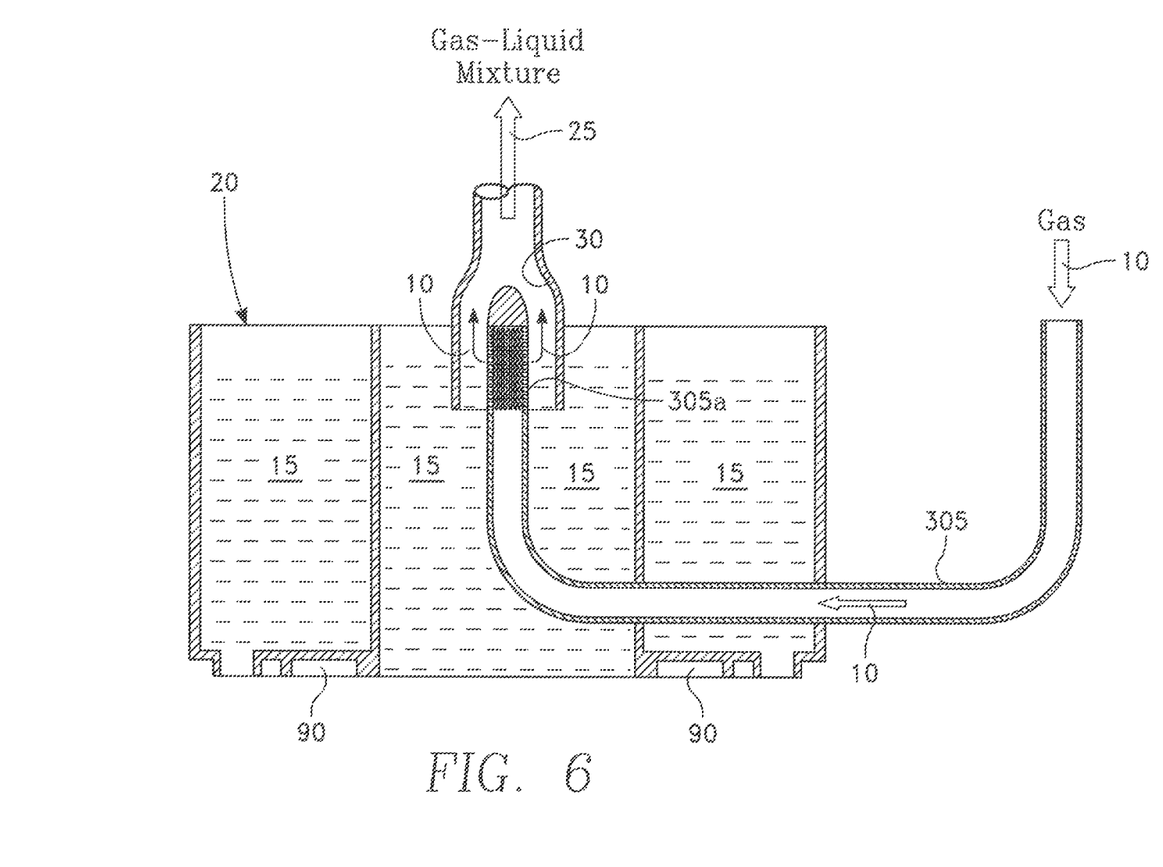
FIG. 6 is a detailed illustration of a cross section view of a portion of a tank and shows the gas line in fluid communication with the tank and inlet of the centrifugal gas compressor.

The tank 20 is preferably a structure having an interior space particularly suited for holding and storing a fluid (e.g., liquid 15 or gas 10, as shown in FIG. 6) or other substance. The tank 20 may also be a hyperbaric tank capable of withstanding high fluidic pressure and may also comprise one or more openings for coupling or fitting various components. For example, as shown in FIGS. 1A and 1B, the tank 20 may comprise a gas line 305 configured to introduce gas 10 into the interior space of the tank 20. Thus, when liquid 15 is stored in the tank 20, the gas line 305 may provide gas 10 into the liquid 15 via diffusion in order to create a gas-liquid mixture 25 (shown in FIG. 6). In this manner, the gas 10 may be entrained in the liquid 15 (e.g., air entrained in a water).

FIGS. 1A and 1B also depict a first heat exchanger 90 coupled to the tank 20. The first heat exchanger 90 may provide isobaric heat to the tank 20 and thus may be in a heat exchange relationship with the tank 20. Specifically, as liquid 15 mixes with gas 10 in the tank 20, the gas-liquid mixture 25 entering the inlet 30 of the centrifugal gas compressor 100 downstream may likewise be heated, preferably at a constant temperature (i.e., isothermal compression). In these embodiments, various types of heat exchangers 90 may be used (e.g., fluid heat exchangers, plate heat exchangers). For example, in an exemplary embodiment, the heat exchanger 90 may be a countercurrent flow heat exchange system where fluids may flow in opposing directions (e.g., liquid-gas).

The centrifugal gas compressor 100 is preferably a compressor that functions similarly to a trompe and may be rotatably coupled to a downstream end of the tank 20 via an inlet 30. Unlike a trompe, however, embodiments of the centrifugal gas compressor 100 preferably utilizes the acceleration of gravity via centrifugal force in order to build pressure. In particular, upon receiving the gas-liquid mixture 25 from the inlet 30, the centrifugal gas compressor 100 may be configured to spin or rotate about the central longitudinal axis 101 to create a centrifugal force that separates the gas 10 from the gas-liquid mixture 25. That separated gas 10 may then be compressed via the centrifugal acceleration and transported to the annular space 200a of the shaft 200 due to the high pressure generated by the centrifugal gas compressor 100. Additional details about the centrifugal gas compressor 100 and its operations are discussed further below.

As the centrifugal gas compressor 100 separates the gas 10 from the from the gas-liquid mixture 25, the liquid 15 may also be separated as well, and in a preferred embodiment, that separated liquid 15 (and any excess gas 10) may be released or expelled from the centrifugal gas compressor 100 via outflow ports 136 of the centrifugal gas compressor 100. In various embodiments, the released liquid 15 may be recovered and fed back into the tank 20, such that the outflow ports 136 may be in fluid communication with the tank 20. In these embodiments, a pump may be implemented (not shown) to feed the released liquid 15 back into the tank 20. In this manner, the recovered liquid 15 may reenter the Ericsson cycle turbine engine 1000.

Accordingly, various embodiments of the tank 20 may utilize one or more pumps (not shown) that is self-priming, and in those embodiments, some liquid may be stored inside the pump(s) in order to initiate the pumping process. For example, a first pump may be implemented to initiate the transfer of the gas-liquid mixture 25 from the tank 20 into the inlet 30 of the centrifugal gas compressor 100. In other embodiments, an additional second pump may be implemented to recover liquid 15 released from the outflow ports 136 of the centrifugal gas compressor 100 by transferring that liquid 15 back into the tank 20. In other embodiments, however, the Ericsson cycle turbine engine 1000 may lack pumps and thus may not be self-priming. In these embodiments, other various means may be used to transport liquid 15 or gas-liquid mixture 25 into the centrifugal gas compressor 100.

FIGS. 1A and 1B also shows that the Ericsson cycle turbine engine 1000 may further comprise a shaft 200 and thermos 50. The shaft 200 may be a rotating machine member fixedly coupled to the downstream end of the centrifugal gas compressor 100 and may be centered about a central longitudinal axis 101 or axis of rotation. The shaft 200 may also have a downstream end that extends or traverses within the thermos 50, and more particularly, within a second heat exchanger 300 located within the thermos 50. The thermos 50 may be a tank or enclosure configured to maintain heat therein and may comprise an inner wall 54 and outer wall 55 enclosing a vacuum therebetween. In various embodiments, the thermos 50 may further comprise a liner 53 having insulating material (e.g., radiation blankets) to help maintain heat emitted by the second heat exchanger 300 within the thermos 50.

As shown in FIG. 1B, the shaft 200 preferably includes an annular space 200a that is in fluid communication with the centrifugal gas compressor 100. Thus, compressed gas 10 exiting the centrifugal gas compressor 100 may flow though the annular space 200a of the shaft 200. Notably, FIG. 1B shows that embodiments of the shaft 200 may also comprise fins 56 that radially expand from the shaft 200 and engage with the second heat exchanger 300. As a result, these fins 56 are preferably in a heat exchange relationship with the second heat exchanger 300 in order to efficiently transfer heat towards the annular space 200a of the shaft 200. In this manner, isobaric heat may be thoroughly applied towards the compressed gas 10 traveling axially downstream though the annular space 200a of the shaft 200.

Regarding the second heat exchanger 300, various types of second heat exchangers 300 may be used for the thermos 50 (e.g., fluid heat exchangers, plate heat exchangers). For example, like the first heat exchanger 90, an exemplary embodiment of the second heat exchanger 300 may be a countercurrent flow heat exchange system where fluids may flow in opposing directions (e.g., liquid-gas). In this embodiment, the countercurrent current flow heat exchange system may engage with the fins 56 of the shaft in order to apply heat towards the compressed gas 10 traveling downstream though the shaft 200.

Turning to FIG. 1B, the Ericsson cycle turbine engine 1000 may further comprise a reaction turbine 400 fixedly coupled to a downstream end of the shaft 200 and may be positioned near the aft end of the thermos 50. The reaction turbine 400 is preferably configured to convert fluid flow of the compressed gas 10 into useful work and may comprise a rotor 405 (shown in FIG. 3) fixedly coupled to the shaft 200 and vanes 410 (shown in FIG. 3) disposed within the rotor 405. Notably, the vanes 410 are preferably in fluid communication with the annular space 200a of the shaft 200. The vanes 410 may also extend or traverse in a curved manner away from the shaft 200 or axis of rotation (i.e., central longitudinal axis 101) and may be positioned equidistant from each other (shown in FIG. 5). Thus, when exiting the shaft 200 and heat exchanger 300, the compressed gas 10 may travel through the rotor 405 and expel radially from the reaction turbine 400, causing the compressed gas 10 released from the reaction turbine 400 to act against the vanes 410. In this manner, the vanes 410 may move or impart rotational energy to the rotor 405, thereby driving and accelerating the reaction turbine 400.

In some embodiments, each vane 410 may further comprise a choke 410a (shown in FIG. 5), which may be a narrow spacing within the vane 410, and each choke 410a may later expand in diameter downstream. Thus, as the end of the choke 410a further increases in diameter downstream, each choke 410a may provide additional centrifugal force by expanding the gases exiting the vanes 410. In this manner, the release of the compressed gas 10 may improve and optimize the delivery of energy density.

In various embodiments, the Ericsson cycle turbine engine 1000 may further comprise a power take-off shaft 75, as shown in FIGS. 1A and 1B. The power take-off shaft 75 may be configured to transfer mechanical power to the shaft 200 in order to initiate take off to the Ericsson cycle turbine engine 1000. Embodiments of the power take-off shaft 75 may be embodied as a crankshaft or an eccentric shaft, which may initiate the driving power of the Ericsson cycle turbine engine 1000 in the form of a torque or rotary speed.

Additionally, in various embodiments, the thermos 50 may further comprise a spark plug and/or fuel injector. The spark plug may be configured to produce a spark to create an ignition of combustion, whereas the fuel injector may be configured to spray fuel for combustion for the Ericsson cycle turbine engine 1000. In various embodiments, the thermos 50 may instead comprise a spark plug fuel injector (SPFI) 65, which may be a spark plug and fuel injector combination. In this embodiment, the SPFI may be spark plug having a gas supply inlet configured to deliver fuel directly to a combustion chamber, as shown in FIGS. 1A and 1B.

In operation, liquid 15 stored in the tank 20 may be subject to heat by a first heat exchanger 90. The heated liquid 15 may also mix with gas 10 provided by the gas line 305 via diffusion to create a gas-liquid mixture 25 within the tank 20. The gas-liquid mixture 25 may then enter the annular chamber 107 of the centrifugal gas compressor 100 via the inlet 30. The centrifugal gas compressor 100, which functions similar to a trompe, preferably separates the gas 10 and liquid 15 from the gas-liquid mixture 25 via centrifugal acceleration.

Specifically, regarding the operation and inner workings of the centrifugal gas compressor 100, gas-liquid mixture 25 entering the annular chamber 107 may first flow into the first fin cavities 110 and then outwardly into the separation chambers 120. There, within the separation chambers 120, gas 10 is preferably separated from the gas-liquid mixture 25 when the centrifugal gas compressor 100 creates a centrifugal force via spinning or rotation. That centrifugal force generally causes the gas 10 and liquid 15 to separate with the separated gas 10 traveling inwardly towards the compressed gas passages 130 near the central longitudinal axis 101 (i.e., axis of rotation). In particular, columns of the gas-liquid mixture 25 within the separation chambers 120 may be subject to G forces, thereby increasing the weight of the gas-liquid mixture 25. This increase in weight may create outward pressure to the gas-liquid mixture 25. Given a bubble's tendency to rise to the surface, gas bubbles create the buoyant force needed to separate the gas 10 from the liquid 15, such that the centrifugal gas compressor 100 may create bubbles within the gas-liquid mixture 25. This buoyant force may be the difference between the density of the substance in the void (i.e., gas 10) and the physical weight of the liquid 15 due to gravitational acceleration. Notably, any change in revolutions-per-minute may affect the pressure within the centrifugal gas compressor 100, and the speed of the falling column of liquid 15 generally must exceed the bubble's rise velocity in order to make the bubble sink inwards.

The size of the bubbles created by the centrifugal force are preferably small as possible, as bubbles generally have a relatively large surface to volume ratio. Small bubbles also generally tend to have less buoyancy, which lowers the bubble's tendency to float. The size of small bubbles also tend to have a very high or greater surface area to volume ratio, which is necessary to facilitate and increase the rate of heat transfer to the liquid 15. Given that the gas 10 being compressed may be in close proximity to the gas-liquid surface area, the centrifugal gas compressor 100 may extract heat from each compressed bubble at the same rate where the heat is being generated. As a result, the compression preferably becomes an isothermal event and the centrifugal gas compressor 100 may embody an ideal gas compressor. Therefore, the outlet temperature of the compressed gas 10 is preferably, substantially the same as the inlet temperature of the gas 10.

Figure 2:
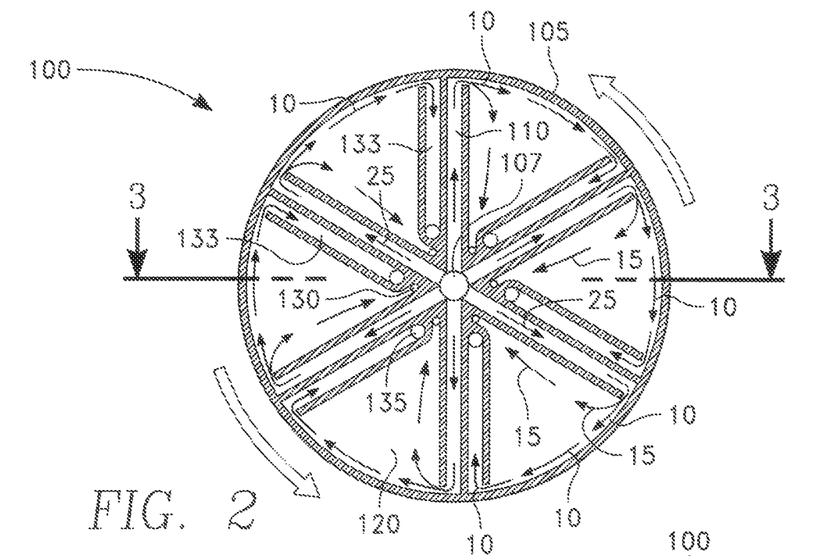
FIG. 2 depicts a cross section view of one embodiment of a centrifugal gas compressor taken from FIG. 1B.

Regarding the liquid 15 portion, the separated liquid 15 may travel outwards radially towards the outer perimeter of the centrifugal gas compressor 100 and into second fin cavities 133 (shown in FIG. 2). There, centrifugal acceleration may further release that separated liquid 15 and any excess gas 10 into the outflow ports 136 of the centrifugal gas compressor 100 (shown in FIG. 3). In various embodiments, this separated liquid 15 may then be recovered by pumping the released liquid 15 back into the tank 20. There, the liquid 15 may again be subject to the first heat exchanger 90 and then entrained with additional gas 10 with bubbles via the gas line 305 in order to re-enter the Ericsson cycle turbine engine 1000.

Turning to the separated gas 10 portion, the compressed gas 10 exiting the centrifugal gas compressor 100 via the compressed gas passages 130 may be ported into the annular space 200a of the shaft 200. There, within the shaft 200, the compressed gas 10 may be subject to heat from a second heat exchanger 300, such as for example a counterflow heat exchanger. The compressed gas 10 flowing downstream through the shaft 200 is preferably subject to heat, such that isothermal expansion may be achieved. As the heated, compressed gas 10 travels downstream end of the shaft 200 and exits the heat exchanger 300, the compressed gas 10 is preferably expelled through the reaction turbine 400. There, the compressed gas 10 preferably actuates the reaction turbine 400 in a rotating manner when exiting the vanes 410 of reaction turbine 400. In this manner, the reaction turbine 400 may further drive the Ericsson cycle turbine engine 1000, thereby improving its operating efficiency. In the event the release of gas maintains zero angular velocity, maximum efficiency may be achieved. Preferably, the reaction turbine 400 is disposed within a heated chamber (e.g., thermos), which can be heated by various means, and the heat is preferably maintained within the thermos 50 to help maintain operating efficiency.

In various embodiments, the type of liquid and gas may vary, depending on the application of the Ericsson cycle turbine engine 1000. For example, in various embodiments, any liquid 15 may be used, but mercury may generate the highest pressure due to its high density. Water may also be contemplated due to its high heat capacity, whereas oil may be used due its low vapor pressure.

Regarding the gas 10, various embodiments of gas 10 may be used, but exemplary embodiments of the gas 10 may be helium or air. In alternative embodiments, argon and ammonia may be used as gas 10 instead, depending on the situation. For example, if the gas 10 is air, a constant volume void may displace the same amount of water and the buoyant force of the bubble may increase in a linear fashion. as the weight of the water may also further increase the bubble's movement away from the central longitudinal axis of rotation. The buoyant force of other gases 10, however, may vary. Also, when subject to centrifugal compression, the buoyancy of the bubble may suddenly rise when the PSI is in the range of 1-3 ATM. This may be due to the fact the weight of the water may be increasing faster than the shrinking of the bubble volume.

Figure 3:
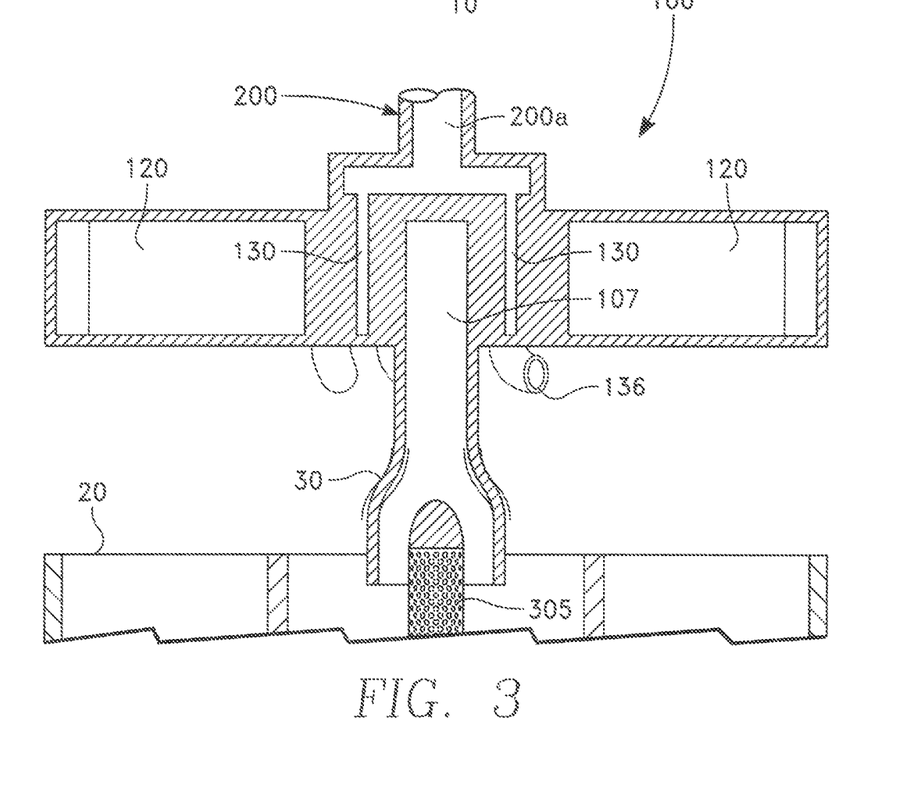
FIG. 3 depicts a detailed, cross section view of one embodiment of the centrifugal gas compressor taken from FIG. 2.

FIGS. 2 and 3 are illustrations of one embodiment of the centrifugal gas compressor 100. Specifically, FIG. 2 depicts a cross section view of the centrifugal gas compressor 100 taken from FIG. 1B. FIG. 3 depicts a detailed, cross section view of the centrifugal gas compressor 100 taken from FIG. 2. As shown in FIGS. 2 and 3, one embodiment of the centrifugal gas compressor 100 may comprise: a rotating container 105 having an inlet 30, an annular chamber 107 in fluid communication with the inlet 30, first fin cavities 110, separation chambers 120, second fin cavities 133, compressed gas passages 130, excess fluid passages 135, and outflow ports 136.

The rotating container 105 may be configured to rotate along a central longitudinal axis 101 via the shaft 200 and thus may impart a centrifugal force to fluids stored or flowing inside the centrifugal gas compressor 100. Thus, as discussed above, the centrifugal gas compressor 100 may function similarly to a spinning wheel trompe in order to separate gas 10 from a gas-liquid mixture 25 and compress that gas 10 via centrifugal acceleration. The rotating container 105 may comprise an inlet 30 in fluid communication with an annular chamber 107, and the annular chamber 107, which is preferably disposed along the central longitudinal axis 101, preferably receives the gas-liquid mixture 99 from the tank 20.

FIGS. 2 and 3 also show that the centrifugal gas compressor 100 may comprise first fin cavities 110, which are preferably disposed within the rotating container 105. The first fin cavities 110 are preferably thin chambers that are substantially rectangular in shape and preferably radially disposed within the rotating container 105. Importantly, the interior space of the annular chamber 107 may extend radially via the first fin cavities 110, which are preferably positioned in an equidistant and diametrically opposing manner with respect to each other, as shown in FIG. 2. In this manner, the centrifugal gas compressor 100 may maintain equal weight distribution as fluid flows through the first fin cavities 110.

FIGS. 2 and 3 also show that the centrifugal gas compressor 100 may also comprise separation chambers 120. The separation chambers 120 are preferably interior spaces within the rotating container 105 located between the first fin cavities 110. Preferably, the separation chambers 120 are in fluid communication with the first fin cavities 110 near the outer perimeter of the rotating container 105. Thus, the interior space of the annular chamber 107 may extend radially via the first fin cavities 110 and into the separation chambers 120. In this manner, the gas-liquid mixture 25 entering the annular chamber 107 via the inlet 30 may flow radially outwards through the first fin cavities 110 and into the separation chambers 120, during centrifugal acceleration. At the opposing end, near the annular chamber 107 and near the center of the rotating container 105 (i.e., central longitudinal axis 101 or axis of rotation), the separation chambers 120 are preferably in fluid communication with the compressed gas passages 130. Thus, gas 10 separated from the gas-liquid mixture 25 via centrifugal force may be compressed and flow radially inward from the separation chambers 120 and into the compressed gas passages 130, near the central longitudinal axis 101.

Like the first fin cavities 110, the separation chambers 120 are also preferably positioned in an equidistant and diametrically opposing manner with respect to each other. This may allow the separation chambers 120 to maintain equal weight distribution for the centrifugal gas compressor 100, especially during rotational movement. In various embodiments, the separation chambers 120 may also be somewhat triangular in shape in order to allow gas that has been separated from the gas-liquid mixture 25 via centrifugal force to be compressed and funneled directly into the compressed gas passages 130.

FIGS. 2 and 3 also depict second fin cavities 133, which are preferably adjacently disposed in-between the first fin cavities 110 and separation chambers 120 within the rotating container 105. Like the first fin cavities 110, the second fin cavities 133 are likewise preferably thin chambers that are substantially rectangular in shape and preferably radially disposed within the rotating container 105. The second fin cavities 133 are also preferably equidistant and diametrically opposed to each other in order to maintain equal weight distribution for the centrifugal gas compressor 100. Notably, the second fin cavities 133 are preferably in fluid communication with the separation chambers 120 near the outer perimeter of the rotating container 105. In this manner, the gas-liquid mixture 25 traveling through the first fin cavities 110 and into the separation chambers 120 may flow either radially inwards towards the compressed gas passages 130 or radially outwards, towards the second fin cavities 133 in a U-shaped fashion. This may allow liquid 15 that has been separated from the gas-liquid mixture 25 via centrifugal acceleration to flow directly into the second fin cavities 133 due to the liquid's higher density than gas. Excess fluid passages 135 located near the center of the centrifugal gas compressor 100 and in fluid communication with the second fin cavities 133 may release the liquid 15 and any excess gas 10 out of the centrifugal gas compressor 100 via the outflow ports 136. Gas 10 separated from the gas-liquid mixture 25, on the other hand, may travel inwardly through the separation chambers 120 and into the compressed gas passages 130, which are preferably located radially inwards from the separation chambers 120 and near the center of rotation of the centrifugal gas compressor 100.

FIGS. 2 and 3 also depict compressed gas passages 130 located near the central longitudinal axis 101. In particular, the compressed gas passages 130 may be located radially inward from the separation chambers 120 and may be in fluid communication to both the separation chambers 120 and the annular space 200a of the shaft 200. In this manner, the compressed gas passages 130 may permit transfer of the compressed gas 10 from the separation chambers 120 into the annular space 200a of the shaft 200. Given that the compressed gas passages 130 may be in fluid communication between the separation chambers 120 and annular space 205 of the shaft 200, as the centrifugal gas compressor 100 rotates, the buoyancy of the gas 10 within the gas-liquid mixture 25 may separate and compress the gas 10 during centrifugal rotation. As a result, the compressed gas 10 may travel from the separation chambers 120 and through the annular space 200a of the shaft 200. On the other hand, excess fluid passages 135 located at the downstream end of the second fin cavities 133 may release liquid 15 separated from the compressed gas 10.

As discussed above, centrifugal force may be used to compress the gas bubbles. The centrifugal force may be created by the centrifugal nature of the centrifugal gas compressor 100 and may increase the weight of a column of liquid (i.e., liquid from a radially inboard region to a radially outboard region) by subjecting the centrifugal gas compressor 100 to several thousand G forces. Notably, a wide range of final pressures can be achieved by adjusting RPM of the centrifuge.

The centrifugal force of a spinning column of liquid via the separation chambers 120 at different radii ("r") may be calculated by determining the pressure P of a rotating fluid, as follows:

$$P = \frac{\rho \omega^2 r^2}{2}$$

where P=pressure; ρ=density of the fluid in mass per volume; ω=angular velocity in radians per second; r=radius In order to function efficiently, the path of the liquid transfer from the center of the centrifugal gas compressor 100 to the outside is preferably constant. Additionally, the flow rate generally must be greater than the speed in which the bubbles float to the center. Thus, the final pressure of the gas after the gas returns to the center or annular space 200a of the shaft 200 is preferably:

$$P = \frac{(\rho_{liquid} - \rho_{gas})\omega^2 r^2}{2}$$

Therefore, the speed of the falling column of liquid 15 via the separation chambers 120 must exceed the bubble rise velocity in order to make the bubbles or gas sink. Preferably, in the centrifugal gas compressor 100, the buoyant force of the gas bubble may be directed radially inboard towards the central longitudinal axis 101 of the rotating container 105. To compress the gas 10, the bubble must be forced to move radially inwards and thus the buoyant force must be less than the centrifugal force acting on the gas bubble. In other words, the centrifugal force acting on the liquid intermediate within the separation chambers 120 must be greater than the buoyant force.

Figure 4:
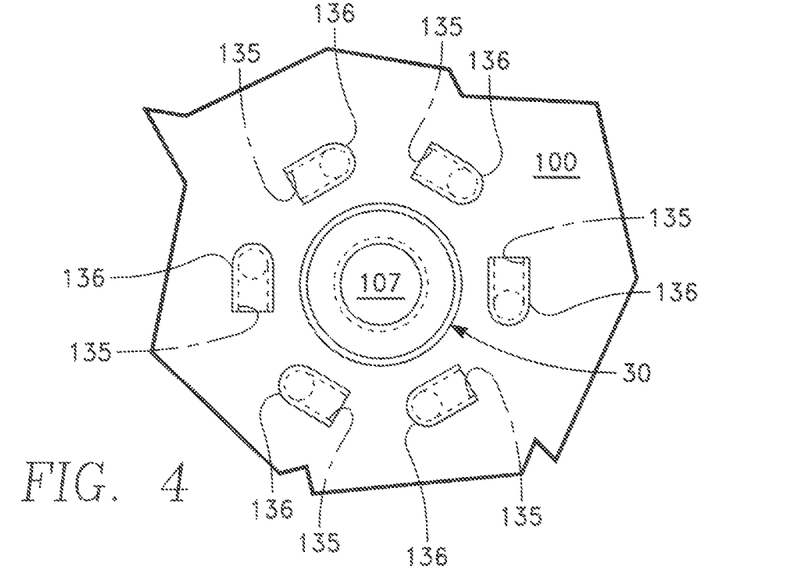
FIG. 4 is an illustration of a bottom perspective view of a portion of one embodiment of the centrifugal gas compressor and shows the outflow ports.

FIG. 4 is an illustration of a bottom perspective view of a portion of one embodiment of the centrifugal gas compressor 100 and shows the outflow ports 136. As shown in FIG. 4, one embodiment of the centrifugal gas compressor 100 may comprise an inlet 30 and outflow ports 136. As discussed above, each outflow port 136 may be in fluid communication with the excess fluid passage 135, and the excess fluid passages 135 may be in fluid communication with the second fin cavities 133. Here, the outflow ports 136 may be adapted to release liquid 15 and any excess gas 10 separated from the gas-liquid mixture 25 from the centrifugal gas compressor 100. Although FIG. 4 does not depict any piping or lines coupled to the outflow ports 136, various embodiments of the centrifugal gas compressor 100 may implement additional flow lines to redirect the separated liquid 15 and any excess gas 10 expelling from the outflow ports 136 back into the tank 20.

Figure 5:
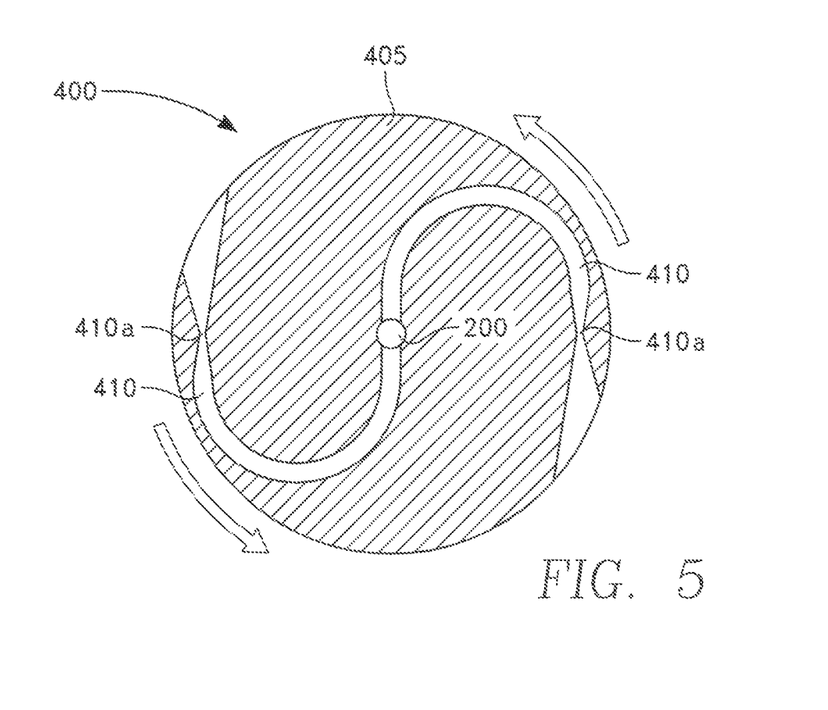
FIG. 5 is an illustration of a cross section view of one embodiment of a reaction turbine taken from FIG. 1B.

FIG. 5 is an illustration of a cross section view of one embodiment of a reaction turbine 400 taken from FIG. 1B. As discussed above, the reaction turbine 400 may be a mechanical device that converts energy from the compressed gas 26 into useful work in order to further drive the Ericsson cycle turbine engine 1000. As shown in FIG. 5, one embodiment of the reaction turbine 400 may comprise a rotor 405 and vanes 410, and each vane 410 may further comprise a choke 410a.

In an exemplary embodiment, the rotor 205 may be operably coupled to the downstream end of the shaft 200, which is preferably disposed along the axis of rotation or central longitudinal axis 101. Additionally, the vanes 410 may radially extend from the center of the rotor 205. Importantly, each vane 410 may extend or traverse in a curved manner away from the shaft 200 or axis of rotation and may be positioned equidistant from each other, as shown in FIG. 5. In this manner, as the compressed gas 10 expels radially from the reaction turbine 400, the released gas 10 may act towards the vanes 410, such that the vanes 410 may move or impart rotational energy to the rotor 405. Additionally, each choke 410a, which may be a narrow spacing within the vane 410, may further provide additional centrifugal force, as the choke 410a further increases in diameter downstream. In this manner, the reaction turbine 400 may be configured to improve the delivered energy density and generally optimize the expansion of the gases 10 exiting the vanes 410. This may allow the Ericsson cycle turbine engine 1000 to increase its thermal and operating efficiency.

FIG. 6 is a detailed illustration of a cross section view of a portion of a tank 20 and shows the gas line 305 in fluid communication with the tank 20 and inlet 30 of the centrifugal gas compressor 100. As shown in FIG. 6, one embodiment of the tank 20 may be rotatably coupled to the inlet 30 of the centrifugal gas compressor 100 and may comprise liquid 15, a heat exchanger 90, and a gas line 305. The liquid 15, which is preferably stored within the tank 20, may mix with a gas 10 introduced through the gas line 305. Excess liquid 15 expelled from the outflow ports 136 of the centrifugal gas compressor 100 may also reenter the tank 20 and likewise mix with the gas 10 provided by the gas line 305. The heat exchanger 90, which is preferably coupled to the tank 20, may provide heat to the tank 20, such that isobaric heat may be applied towards the liquid 15 entering the inlet 30 of the centrifugal gas compressor 100. Notably, the liquid 15 may be in a heat exchange relationship with the heat exchanger 90 as the liquid 15 mixes with gas 10 and as the gas-liquid mixture 25 moves downstream towards through the inlet 30 of the centrifugal gas compressor 100.

As mentioned above, various types of heat exchangers 90 may be used (e.g., fluid heat exchangers, plate heat exchangers), and the tank 20 may be heated in various ways. For example, in an exemplary embodiment, the heat exchanger 90 may be a countercurrent flow heat exchange system where fluids flow in opposite directions (e.g., liquid-gas). The countercurrent current flow heat exchange system may also allow the transfer of most heat from the heat (transfer) medium per unit mass due to the fact that the average temperature difference along any unit length is higher.

Importantly, FIG. 6 shows that the gas line 305 may be coupled to the tank 20 and may have a first end 305a disposed substantially within the tank 20 and inlet 30 of the centrifugal gas compressor 100. Preferably, that first end 305a of the gas line 305 may comprise multiple holes, such that the first end 305a of the gas line 305 may be porous. In this manner, the gas line 305 may diffuse the gas 10 into the liquid 15 in order to create a gas-liquid mixture 25 that preferably enters the inlet 30 of the centrifugal gas compressor 100.

As mentioned above, various embodiments of the tank 20 may include a pump (not shown) that helps transfer fluids (e.g, gas 10, liquid 15, gas-liquid mixture 25) downstream from the tank 20 and into the inlet 30 of the centrifugal gas compressor 100. Additionally, in those embodiments, the pump may be self-priming, such that a required amount of liquid may be stored inside the pump in order to initiate the pumping process. In other embodiments, the tank 20 may lack a pump and may not be self-priming.

Figure 7:
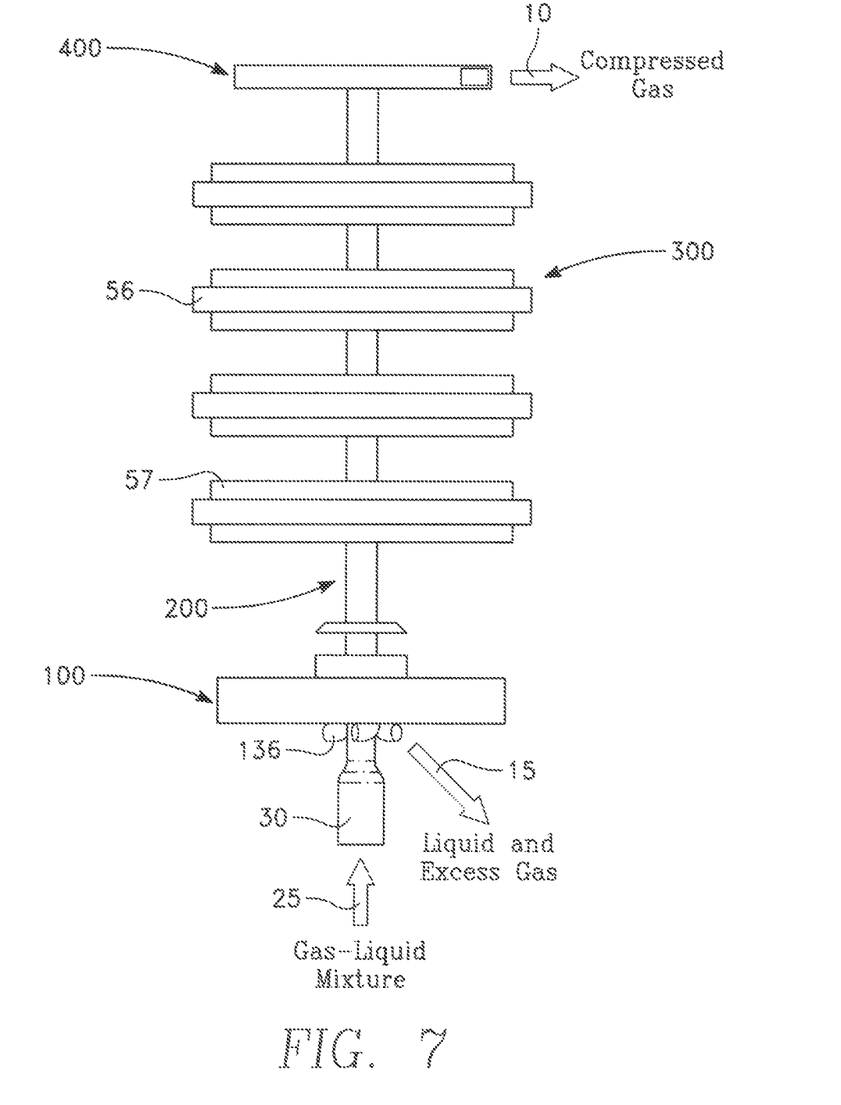
FIG. 7 is an illustration of the centrifugal gas compressor, shaft, heat exchanger, and reaction turbine coupled to each other and depicts the structural and operational relationship therewith.

FIG. 7 is an illustration of the centrifugal gas compressor 100, shaft 200, heat exchanger 300, and reaction turbine 400 coupled to each other and depicts the structural and operational relationship therewith. Specifically, FIG. 7 shows a first end of the shaft 200 fixedly coupled to the downstream end of the centrifugal gas compressor 100, and the reaction turbine 400 fixedly coupled to the second end or downstream end of the shaft 200. Notably, FIG. 7 shows that the mid-portion of the shaft 200 may comprise fins 56 that are disposed within the piping 57 of the heat exchanger 300. The centrifugal gas compressor 100, shaft 200, and reaction turbine 400 may also be centered about a central longitudinal axis 101 (shown in FIG. 1B) and may be fixedly coupled to each other. In this manner, when the reaction turbine 400 rotates due to the release of the compressed gas 10, the shaft 200 and centrifugal gas compressor 100 may rotate as well.

FIG. 7 also depicts the general flow cycle of the Ericsson cycle turbine engine 1000. In particular, a gas-liquid mixture 25 may first enter the inlet 30 of the centrifugal gas compressor 100. The centrifugal gas compressor 100, which functions similar to a trompe, preferably separates the gas 10 from the gas-liquid mixture 25 and separates that gas 10 via centrifugal acceleration. The centrifugal acceleration may also separate the liquid 15 from the gas-liquid mixture 25 and release that separated liquid 15 and any excess gas 10 from the outflow ports 136 of the centrifugal gas compressor 100. In some embodiments, the released liquid 15 may be recovered by pumping the released liquid 15 back to the tank 20, and that recovered liquid 15 may reenter the Ericsson cycle turbine engine 1000.

The compressed gas 10 exiting the centrifugal gas compressor 100 preferably travels through the annular space 200a of the shaft 200 and may be heated by the heat exchanger 300, such as for example a counterflow heat exchanger. There, the compressed gas 10 flowing downstream through the shaft 200 is preferably subject to heat, such that isothermal expansion may be achieved. As the heated, compressed gas 10 travels downstream end of the shaft 200 and exits the heat exchanger 300, the compressed gas 10 may actuate the reaction turbine 400 by exiting the vanes 410 of reaction turbine 400. In this manner, the reaction turbine 400 may further drive the Ericsson cycle turbine engine 1000, thereby improving efficiency of the Ericsson cycle turbine engine 1000. Preferably, the reaction turbine 400 is disposed within a heated chamber (e.g., thermos 50), which can be heated by various means, and the heat is preferably maintained within the thermos 50 in order to improve operating efficiency.

The foregoing description of the embodiments of the Ericsson cycle turbine engine has been presented for the purposes of illustration and description. While multiple embodiments are disclosed, other embodiments will become apparent to those skilled in the art from the above detailed description. As will be realized, these embodiments are capable of modifications in various obvious aspects, all without departing from the spirit and scope of the present disclosure. Accordingly, the detailed description is to be regarded as illustrative in nature and not restrictive.

Although embodiments of the Ericsson cycle turbine engine are described in considerable detail, other versions are possible. Therefore, the spirit and scope of the appended claims should not be limited to the description of versions included herein.

Except as stated immediately above, nothing which has been stated or illustrated is intended or should be interpreted to cause a dedication of any component, step, feature, object, benefit, advantage, or equivalent to the public, regardless of whether it is or is not recited in the claims. The scope of protection is limited solely by the claims that now follow, and that scope is intended to be broad as is reasonably consistent with the language that is used in the claims. The scope of protection is also intended to be broad to encompass all structural and functional equivalents.

What is claimed as new and desired to be protected by Letters Patent is set forth in the appended claims:

1. An Ericsson cycle turbine engine, comprising:
   a centrifugal gas compressor being fed with a gas-liquid mixture and configured to separate a gas from said gas-liquid mixture and compress said gas;
   a shaft coupled to a downstream end of said centrifugal gas compressor and having an annular space traversing therein, said annular space being configured to permit said compressed gas to travel across said shaft;
   a heat exchanger configured to heat said compressed gas; and
   a reaction turbine coupled to a downstream end of said shaft and configured to rotate said shaft when releasing said compressed gas against a plurality of vanes;
   wherein said shaft is disposed within said heat exchanger and fixedly coupled to said centrifugal gas compressor and said reaction turbine, such that when said reaction turbine rotates, said shaft and said centrifugal gas compressor rotates.

2. The Ericsson cycle turbine engine recited in claim 1, characterized in that said centrifugal gas compressor comprises:
   a rotating container configured to rotate about a central longitudinal axis and having an annular chamber configured to receive said gas-liquid mixture;
   a plurality of first fin cavities disposed within said rotating container and extending radially from said annular chamber to a plurality of separation chambers, such that said annular chamber is in fluid communication with said plurality of separation chambers;

a plurality of second fin cavities located within said rotating container and disposed adjacently between said plurality of separation chambers and said plurality of first fin cavities, said plurality of second fin cavities being in fluid communication with said plurality of separation chambers; and a plurality of compressed gas passages located radially inward from said plurality of separation chambers and in fluid communication between said plurality of separation chambers and said annular space of said shaft, such that said plurality of compressed gas passages are configured to permit transfer of said compressed gas from said plurality of separation chambers into said annular space of said shaft.

3. The Ericsson cycle turbine engine recited in claim 2, further comprising a plurality of excess fluid passages in fluid communication with said plurality of second tin cavities, said plurality of excess fluid passages being configured to release a liquid without said compressed gas.

4. The Ericsson cycle turbine engine recited in claim 3, further comprising a plurality of outflow ports in fluid communication with said plurality of excess fluid passages.

5. The Ericsson cycle turbine engine recited in claim 3, characterized in that said liquid is selected from the group of liquids consisting of: a mercury, an oil, and a water.

6. The Ericsson cycle turbine engine recited in claim 1, characterized in that said gas is selected from the group of gases consisting of: a helium, an air, an argon, and an ammonia.

7. An Ericsson cycle turbine engine, comprising:
a centrifugal gas compressor being fed with a gas-liquid mixture and configured to separate a gas from said gas-liquid mixture and compress said gas;
a shaft coupled to a downstream end of said centrifugal gas compressor and having an annular space traversing therein, said annular space being configured to permit said compressed gas to travel across said shaft;
a heat exchanger in heat exchange relationship with said shaft and configured to heat said compressed gas, such that isothermal expansion is approached; and
a reaction turbine coupled to a downstream end of said shaft and configured to rotate said shaft when releasing said compressed gas against a plurality of vanes;
wherein said shaft is disposed within said heat exchanger; and
wherein said centrifugal gas compressor, said shaft, and said reaction turbine are centered about a central longitudinal axis and are fixedly coupled to each other, such that when said reaction turbine rotates, said shaft and said centrifugal gas compressor rotates.

8. The Ericsson cycle turbine engine recited in claim 7, characterized in that said centrifugal gas compressor is a spinning wheel trompe configured to compressed said gas via centrifugal acceleration, said centrifugal gas compressor comprising:
a rotating container configured to rotate about said central longitudinal axis and having an annular chamber configured to receive said gas-liquid mixture;
a plurality of first fin cavities disposed within said rotating container and extending radially from said annular chamber to a plurality of separation chambers, such that said annular chamber is in fluid communication with said plurality of separation chambers;
a plurality of second fin cavities located within said rotating container and disposed adjacently between said plurality of separation chambers and said plurality of first fin cavities, said plurality of second fin cavities being in fluid communication with said plurality of separation chambers; and
a plurality of compressed gas passages located radially inward from said plurality of separation chambers and in fluid communication between said plurality of separation chambers and said annular space of said shaft, such that said plurality of compressed gas passages are configured to permit transfer of said compressed gas from said plurality of separation chambers into said annular space of said shaft.

9. The Ericsson cycle turbine engine recited in claim 8, further comprising a plurality of excess fluid passages in fluid communication with said plurality of second fin cavities, said plurality of excess fluid passages being configured to release a liquid without said compressed gas.

10. The Ericsson cycle turbine engine recited in claim 9, further comprising a plurality of outflow ports in fluid communication with said plurality of excess fluid passages.

11. The Ericsson cycle turbine engine recited in claim 9, characterized in that said liquid is selected from the group of liquids consisting of: a mercury, an oil, and a water.

12. The Ericsson cycle turbine engine recited in claim 7, characterized in that said gas is selected from the group of gases consisting of: a helium, an air, an argon, and an ammonia.

13. An Ericsson cycle turbine engine, comprising:
a tank having a liquid;
a first heat exchanger configured to heat said liquid;
a gas line configured to introduce gas into said liquid to create a gas-liquid mixture;
a centrifugal gas compressor rotatably coupled to a downstream end of said tank and being fed with said gas-liquid mixture. said centrifugal gas compressor being configured to separate said gas from said gas-liquid mixture and compress said gas by near isothermal compression:
a shaft coupled to a downstream end of said centrifugal gas compressor and having an annular space traversing therein, said annular space being configured to permit said compressed gas to travel across said shaft;
a second heat exchanger in heat exchange relationship with said shaft and configured to heat said compressed gas, such that isothermal expansion is approached; and
a reaction turbine coupled to a downstream end of said shaft and configured to rotate said shaft when releasing said compressed gas against a plurality of vanes;
wherein said shaft is disposed within said second heat exchanger; and
wherein said centrifugal gas compressor, said shaft, and said reaction turbine are centered about a central longitudinal axis and are fixedly coupled to each other, such that when said reaction turbine rotates, said shaft and said centrifugal gas compressor rotates.

14. The Ericsson cycle turbine engine recited in claim 13, characterized in that said centrifugal gas compressor is a spinning wheel trompe configured to compressed said gas via centrifugal acceleration, said centrifugal gas compressor comprising:
a rotating container configured to rotate about said central longitudinal axis and having an annular chamber configured to receive said gas-liquid mixture;
a plurality of first fin cavities disposed within said rotating container and extending radially from said annular chamber to a plurality of separation chambers, such that said annular chamber is in fluid communication with said plurality of separation chambers;

a plurality of second fin cavities located within said rotating container and disposed adjacently between said plurality of separation chambers and said plurality of first fin cavities, said plurality of second fin cavities being in fluid communication with said plurality of separation chambers; and a plurality of compressed gas passages located radially inward from said plurality of separation chambers and in fluid communication between said plurality of separation chambers and said annular space of said shaft, such that said plurality of compressed gas passages are configured to permit transfer of said compressed gas from said plurality of separation chambers into said annular space of said shaft.

15. The Ericsson cycle turbine engine recited in claim 14, further comprising a plurality of excess fluid passages in fluid communication with said plurality of second fin cavities, said plurality of excess fluid passages being configured to release a liquid without said compressed gas.

16. The Ericsson cycle turbine engine recited in claim 15, further comprising a plurality of outflow ports in fluid communication with said plurality of excess fluid passages.

17. The Ericsson cycle turbine engine recited in claim 16, characterized in that said liquid is selected from the group of liquids consisting of: a mercury, an oil, and a water.

18. The Ericsson cycle turbine engine recited in claim 17, characterized in that said gas is selected from the group of gases consisting of: a helium, an air, an argon, and an ammonia.

* * * * *